US008363749B2

(12) United States Patent
Lee et al.

(10) Patent No.: US 8,363,749 B2
(45) Date of Patent: Jan. 29, 2013

(54) PEAK TO AVERAGE POWER RATIO REDUCTION

(75) Inventors: Chung-Pi Lee, Taipei (TW);
Hsuan-Jung Su, Sindian (TW)

(73) Assignee: Industrial Technology Research Institute, Hsinchu (TW)

( * ) Notice: Subject to any disclaimer, the term of this patent is extended or adjusted under 35 U.S.C. 154(b) by 946 days.

(21) Appl. No.: 12/431,350

(22) Filed: Apr. 28, 2009

(65) Prior Publication Data
US 2009/0274243 A1 Nov. 5, 2009

Related U.S. Application Data

(60) Provisional application No. 61/050,604, filed on May 5, 2008.

(51) Int. Cl.
*H04L 27/00* (2006.01)
(52) U.S. Cl. .................................. 375/295; 375/296
(58) Field of Classification Search .............. 375/295, 375/296, 297, 345; 455/522
See application file for complete search history.

(56) References Cited

U.S. PATENT DOCUMENTS

| 6,452,978 | B1 | 9/2002 | Reuven et al. | |
|---|---|---|---|---|
| 2002/0061068 | A1* | 5/2002 | Leva et al. | 375/260 |
| 2003/0099302 | A1* | 5/2003 | Tong et al. | 375/264 |
| 2007/0140101 | A1* | 6/2007 | Guo et al. | 370/204 |

FOREIGN PATENT DOCUMENTS

WO   WO 2007/092945   8/2007

OTHER PUBLICATIONS

Amin Mobasher, "Applications of Lattice Codes in Communication Systems", PHD Thesis, Department of Electrical and Computer Engineering, University of Waterloo, Dec. 2007.*
Benoit Meister, "On a matrix decomposition", University of Louis Pasteur, France, Apr. 2002.*
Chung-Pi Lee and Hsuan-Jung Su, "Peak to average power ratio reduction of space-time codes that achieve diversity-multiplexing gain tradeoff", Department of Electrical Engineering, National Taiwan University, Sep. 15-18, 2008, IEEE.*
Amin Mobasher and Amir K. Khandani, "PAPR Reduction Using Integer Structures in OFDM Systems", University of Waterloo, 2004, IEEE.*
Chung-Pi Lee and Hsuan-Jung Su, "Diversity-Multiplexing Gain Tradeoff with Peak to Average Power Ratio Constraints", National Taiwan University, 2008, IEEE.*

* cited by examiner

*Primary Examiner* — Aristocratis Fotakis
(74) *Attorney, Agent, or Firm* — Finnegan, Henderson, Farabow, Garrett & Dunner, LLP

(57) ABSTRACT

A method for transmitting data in a communication system employing an encoding scheme includes processing data in accordance with a particular processing scheme to provide a plurality of information symbols; shaping a constellation of the plurality of information symbols to obtain a plurality of shaped symbols; processing the plurality of shaped symbols in accordance with the encoding scheme to obtain a plurality of transformed signals such that the peak to average power ratio (PAR) of the plurality of transformed symbols is lower than the PAR would be if the information symbols were not shaped into shaped symbols prior to processing into transformed symbols, wherein the encoding scheme may be expressed in a form $x=Gs$, $s \in Z^N$, $G \in R^{N \times N}$, where x is an isomorphic vector representation of transformed signals, G is an N×N invertible generator matrix, s is a vector of a plurality of information symbols, and R represents the real domain; and transmitting the plurality of transformed signals over a communication network.

30 Claims, 14 Drawing Sheets

PEAK TO AVERAGE POWER RATIO REDUCTION

CROSS-REFERENCE TO RELATED APPLICATION

This application claims the benefit of priority from U.S. Provisional Application No. 61/050,604, filed on May 5, 2008, the disclosure of which is expressly incorporated herein by reference to its entirety.

TECHNICAL FIELD

The system and method disclosed herein relate to the field of telecommunications and, more specifically, to a system and method that reduces the peak to average power ratio (PAR) of a communication system.

DESCRIPTION OF RELATED ART

A communication system facilitates the exchange of data between or among various electronic devices, such as a mobile station (MS), a base station (BS), an access point, a cellular phone, a personal digital assistant, a radio, a personal computer, a notebook, a workstation, a global positioning device, a server, and other devices that may be used to transmit and/or receive data. Communication systems are widely deployed to provide various communication services such as voice, video, packet data, messaging, broadcast, etc. These systems may employ various multiplexing schemes such as orthogonal frequency division multiplexing (OFDM), various space-time codes, and spatial multiplexing as in the case of a multiple-input and multiple-output (MIMO) system.

Space-time codes implemented on multiple transmit antennas, as well as the inverse Fourier transform used in OFDM systems, generally result in a high peak to average power ratio (PAR). PAR is a metric that is pertinent to all multiplexing schemes. It is the ratio of the peak power of a signal to the average power of the signal. A high PAR is undesirable because it may require a power amplifier (PA) to operate at an average output power that may be much lower than the peak output power. This reduced power operation is due to the fact that large peaks in the signal may cause the PA to operate in a highly non-linear region, or possibly clip the large peaks, which may then cause intermodulation distortion and other artifacts that may degrade signal quality. By operating the PA at a power lower than its peak power, where the level of operating power may be dependent on the PAR, the PA may be able to handle large peaks in the signal without generating excessive distortion. However, such operation at reduced power results in inefficient operation of the PA at times when large peaks are not present in the signal. Thus, it is desirable to reduce the PAR of the signal so that the PA may operate closer to the peak output power, when necessary.

Over a slow fading point-to-point channel, there is a tradeoff between error probability and data rate in terms of diversity-multiplexing gain (D-MG) tradeoff. However, when multiple antennas are used, space-time codes achieving the D-MG tradeoff generally result in a higher PAR on each antenna.

Constellation shaping is a coding technique that selects constellation points from an expanded constellation by choosing a new boundary on a lattice. It can provide moderate shaping gain on top of the coding gain with modest complexity. The basic idea of constellation shaping is to create a constellation containing more than the minimum number of points needed, and choosing a new boundary that matches an equimetric surface defined by an energy norm of the constellation using only the points inside the optimized boundary. Proper constellation shaping can lead to a reduction of PAR.

A method for reducing the PAR using constellation shaping has been proposed by H. Kwok in "Shape up: peak-power reduction via constellation shaping," Ph.D. dissertation, University of Illinois at Urbana-Champaign, 2001. Kwok describes a method of PAR reduction using the Smith Normal Form matrix decomposition. Kwok's method is relatively complex and requires high computational resources. Moreover, it appears to only be applicable to OFDM systems.

Therefore, a need exists for PAR reduction methods that apply to different communication systems, including OFDM, space-time coded, and MIMO systems, as well as systems that include a combination of these techniques.

SUMMARY

In accordance with a first aspect of the present disclosure, a method for transmitting data in a communication system employing an encoding scheme is provided. The method comprises processing data in accordance with a particular processing scheme to provide a plurality of information symbols; shaping a constellation of the plurality of information symbols to obtain a plurality of shaped symbols; processing the plurality of shaped symbols in accordance with the encoding scheme to obtain a plurality of transformed signals such that the peak to average power ratio (PAR) of the plurality of transformed symbols is lower than the PAR would be if the information symbols were not shaped into shaped symbols prior to processing into transformed symbols, wherein the encoding scheme may be expressed in a form $x=Gs$, $s \in Z^N$, $G \in R^{N \times N}$, where x is an isomorphic vector representation of transformed signals, G is an N×N invertible generator matrix and N is an integer $\geq 0$, s is a vector of a plurality of information symbols chosen from an N-dimensional integer lattice $Z^N$, and R represents the real domain; and transmitting the plurality of transformed signals over a communication network.

In accordance with a second aspect of the present disclosure, there is provided a method for receiving data in a communication system employing an encoding scheme, the method comprising receiving a plurality of transmitted signals, wherein a constellation of the received signals were shaped prior to transmission, processing the plurality of received signals in an estimator to obtain decoded symbols; and de-shaping the decoded symbols to obtain information symbols, wherein the constellation of transmitted signals are processed prior to transmission, such that the peak to average power ratio (PAR) of the transmitted signals is lower than the PAR would be if the transmitted signals were not shaped prior to transmission, and in accordance with an encoding scheme that may be expressed in the form $x=Gs$, $s \in Z^N$, $G \in R^{N \times N}$.

In accordance with a third aspect of the present disclosure, there is provided a device for transmitting data in a communication system employing an encoding scheme, the device comprising a processor for processing data in accordance with a particular processing scheme to provide a plurality of information symbols; a shaping unit for shaping a constellation of the plurality of information symbols to obtain a plurality of shaped symbols; an encoder for encoding the plurality of shaped symbols in accordance with an encoding scheme to obtain a plurality of transformed signals such that the peak to average power ratio (PAR) of the plurality of transformed symbols is lower than the PAR would be if the information symbols were not shaped into shaped symbols prior to processing into transformed symbols, wherein the encoding scheme may be expressed in a form x=Gs, s∈$Z^N$, G∈$R^{N \times N}$; and a transmitter for transmitting the plurality of transformed signals over a communication network.

In accordance with a fourth aspect of the present disclosure, there is provided a device for receiving data in a communication system employing an encoding scheme, the device comprising a receiver to receive a plurality of transmitted signals as received signals, wherein the constellation of the transmitted signals were shaped prior to transmission; a processor to process the plurality of received signals in an estimator to obtain decoded symbols; and a de-shaping unit to de-shape the decoded symbols to obtain information symbols, wherein the constellation of transmitted signals are processed prior to transmission, such that the peak to average power ratio (PAR) of the transmitted signals is lower than the PAR would be if the transmitted signals were not shaped, and in accordance with an encoding scheme that may be expressed in the form x=Gs, s∈$Z^N$, G∈$R^{N \times N}$.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented herein. While the techniques and embodiments will primarily be described in context with the accompanying drawings, those skilled in the art will further appreciate that the techniques and embodiments can also be practiced in other communication systems.

Reference will now be made in detail to exemplary embodiments of the invention, examples of which are illustrated in the accompanying drawings. Wherever possible, the same reference numbers will be used throughout the drawings to refer to the same or like parts.

Methods, apparatus, and systems disclosed herein are configured to reduce PAR without affecting code structures and without transmitting additional information in order for modified space-time codes to still obtain a desirable D-MG tradeoff.

Figure 1:
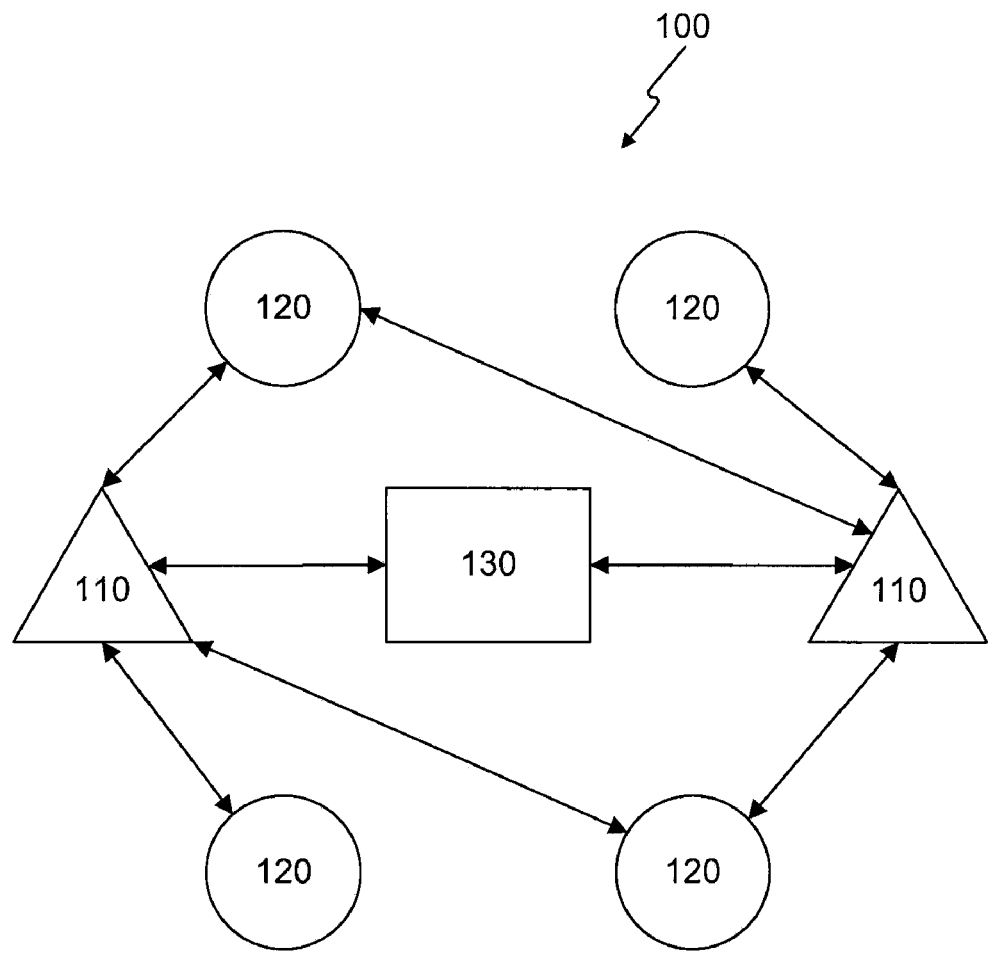
FIG. 1 shows an exemplary communication system.

FIG. 1 shows a wireless communication system 100 containing multiple nodes 110 and multiple user stations 120. Each node 110 is generally a fixed station that communicates with the user stations and may also be referred to as, for example, a base station, an access point, etc. Each node 110 provides communication coverage for a particular geographic area and supports communication for user stations 120 located within the coverage area. A system controller 130 may couple to nodes 110 and provide coordination and control for these nodes. System controller 130 may be a single network entity or a collection of network entities, e.g., an Access Gateway (AGW), a Radio Network Controller (RNC), etc.

User stations 120 may be dispersed throughout system 100, and each user station 120 may be stationary or mobile. Each user station 120 may also be referred to as a mobile station, a mobile equipment, a terminal, an access terminal, a subscriber unit, a station, etc. Each user station 120 may be a cellular phone, a personal digital assistant (PDA), a wireless communication device, a handheld device, a wireless modem, a laptop computer, etc. User station 120 may communicate with zero, one, or multiple nodes 110 on a downlink and/or uplink at any given moment. Downlink (or forward link) refers to a communication link from one of nodes 110 to one of user stations 120. Uplink (or reverse link) refers to a communication link from one of user stations 120 to one of nodes 110. Further, system 100 may utilize OFDM, MIMO, space-coding, a combination of these schemes, and/or other multiplexing schemes.

Figure 2:
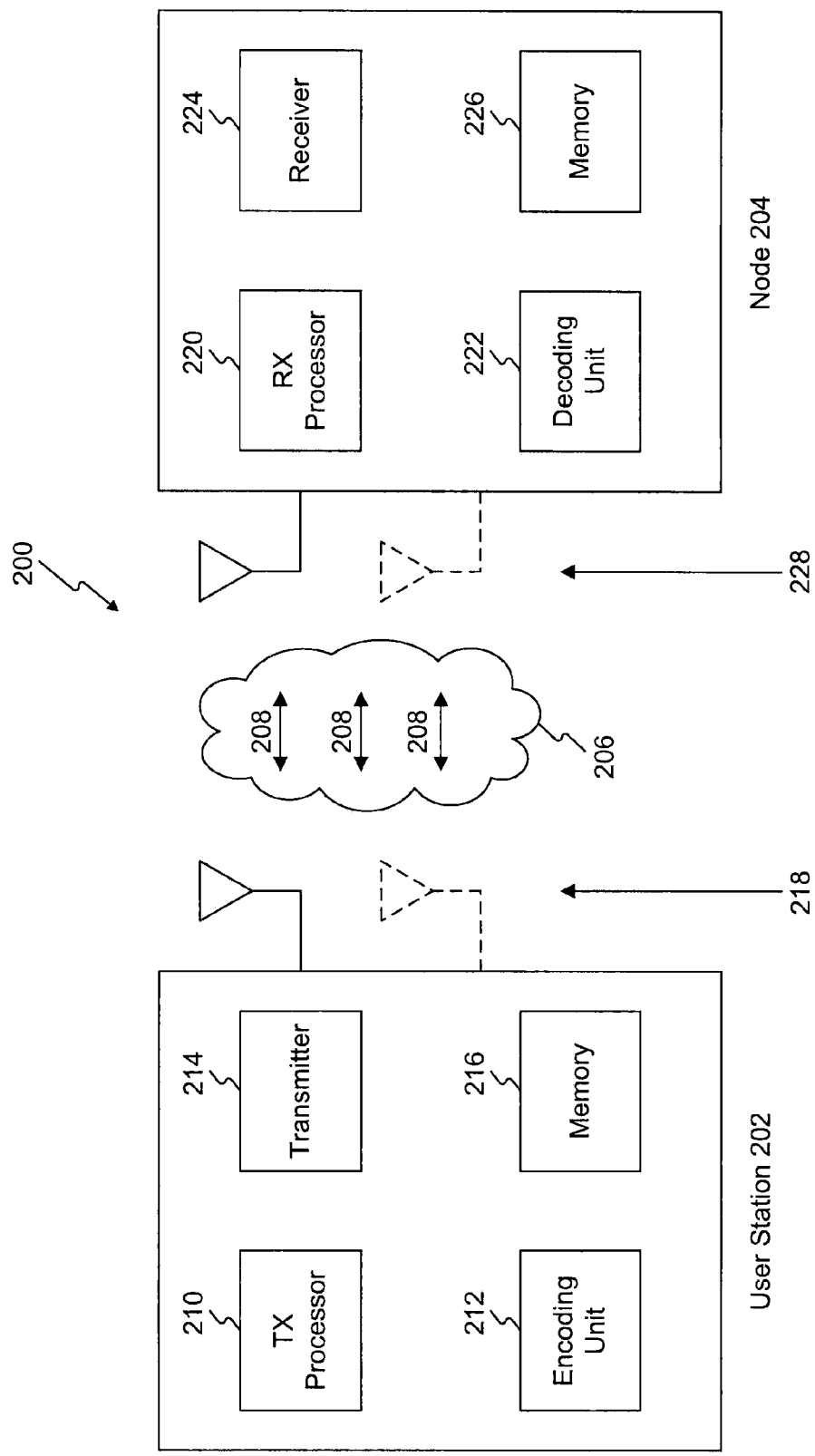
FIG. 2 shows a block diagram of a user station and a node.

FIG. 2 shows an exemplary block diagram of a communication system 200 including a user station 202 and a node 204, which may be one of user stations 120 and nodes 110 in FIG. 1, respectively. For simplicity, only processing units for uplink transmission are shown in FIG. 2.

As shown in FIG. 2, user station 202 and node 204 of communication system 200 may use a communication network 206 to send and/or receive data over channels 208. Communication network 206 may include one or more network types, such as a wide-area network (WAN), a local-area network (LAN), a 3G network, a Worldwide Interoperability for Microwave Access (WiMAX) network, a Long Term Evolution (LTE) network, Code-Division Multiple Access (CDMA) network, Wideband CDMA (WCDMA) network, or any other appropriate protocol to facilitate communication between user station 202 and node 204. Communication network 206 may operate by wireline and/or wireless techniques and may, but need not, operate in accordance with protocols defined in IEEE 802.11, 802.11a, 802.11b, 802.11e, 802.11g, 802.11h, 802.11i, 802.11n, 802.16, 802.16d, 802.16e, and/or 802.16m. Network connections between or among the nodes of communication system 200 may be established via Ethernet, telephone line, cellular channels, or any other transmission media.

User station 202 may include a transmit (TX) processor 210, encoding unit(s) 212, transmitter(s) 214, memory device(s) 216, and TX antenna(s) 218. Node 204 may include a receive (RX) processor 220, decoding unit(s) 222, receiver(s) 224, memory device 226, and RX antenna(s) 228.

With reference to user station 202, TX processor 210 receives traffic data and signaling for transmission to node 204, processes (e.g., interleaves, symbol maps, modulates, etc.) the traffic data, signaling, and/or pilot symbols, and provides modulated symbols. Encoding unit 212 encodes the modulated symbols and generates transformed signals for transmission, and may include its own processor. Transmitter 214 further processes (e.g., converts to analog, amplifies, filters, and frequency upconverts) the transformed signals and generates an uplink signal, which is transmitted via TX antenna 218. Memory device 216 stores data that may be retrieved and used as user station 202 performs various processing tasks, including those performed in encoding unit 212. Memory device 216 may also store predetermined values such as addresses, transmission/reception capacity of channels 208, and information regarding characteristics of communication network 206 and node 204.

With reference to node 204, RX antenna 228 receives the uplink signal from user station 202 and provides a received signal to receiver 224. Receiver 224 processes (e.g., filters, amplifies, frequency downconverts, and digitizes) the received signal and provides received samples. Decoding unit 222 performs symbol estimation and decoding of the received samples. RX processor 220 further processes (e.g., symbol demaps, deinterleaves) the symbol estimates and provides information symbols. Memory device 226 stores information retrieved from the received data and/or data that may be retrieved and used as node 204 performs various processing tasks. Additionally, memory device 226 may store predetermined values that facilitate communication between user station 202 and node 204. In general, the processes performed by RX processor 220 and decoding unit 222 at node 204 are complementary to the processes performed by TX processor 210 and encoding unit 212, respectively, at user station 202.

TX and RX processors 210 and 220 may be medium access controllers (MACs) and/or physical layer processing circuits, and memories 216 and 226 may include any or all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks. Memory devices 216 and 226 may include computer-readable storage medium including application programs, code, and/or instructions that may be executed on processors 210 and 220, respectively, during performance of various processing tasks performed by user station 202 and node 204.

Embodiments consistent with the present invention may be practiced for communication systems employing any of various encoding schemes, including those that achieve the D-MG tradeoff as described earlier. Such encoding schemes may be expressed in the following general form (1):

$$x = Gs \quad s \in Z^N \quad G \in R^{N \times N} \quad (1)$$

where x is an isomorphic vector representation of either space-time code, inverse Fourier transformed symbols in OFDM systems, or other similarly transformed signals; G is an N×N invertible generator matrix (where N is an integer); s is a vector of information symbols chosen from an N-dimensional integer lattice $Z^N$, where Z denotes the set of integers; and R represents the real domain. As an example, a QAM constellation is simply a translation of the integer lattice $Z^N$.

Many encoding schemes may be expressed in the general form of (1). For example, an n×n space-time code X could be expressed in terms of n vectors $x^{(i)}$ of length n, for i=1, 2, ..., n, $$x^{(i)} = G^{(i)} s^{(i)}$$

$$s^{(i)} \in Z[i]^n, \quad G^{(i)} \in C^{n \times n}$$

where Z[i] represents Gaussian integers (i.e. a+bi, a, b∈Z), C represents the complex domain, $s^{(i)}$ is a vector containing n information symbols, and $G^{(i)}$ is the corresponding generator matrix. The isomorphic representation for each $s^{(i)}$ and $G^{(i)}$ may be obtained by separating their real and imaginary parts, as follows, $$s'^{(i)} = \left[ \text{Re}((s^{(i)})^T), \text{Im}((s^{(i)})^T) \right]^T \text{ and}$$

$$G'^{(i)} = \begin{bmatrix} \text{Re}(G^{(i)}) & \text{Im}(G^{(i)}) \\ -\text{Im}(G^{(i)}) & \text{Re}(G^{(i)}) \end{bmatrix}$$

where $v^T$ denotes the transpose of vector v.

As a result, $x'^{(i)} = G'^{(i)} s'^{(i)}$, where $x'^{(i)}$, $s'^{(i)}$, and $G'^{(i)}$ respectively represent the isomorphic representation of $x^{(i)}$, $s^{(i)}$ and $G^{(i)}$. This expression corresponds to general form (1).

Figure 3:
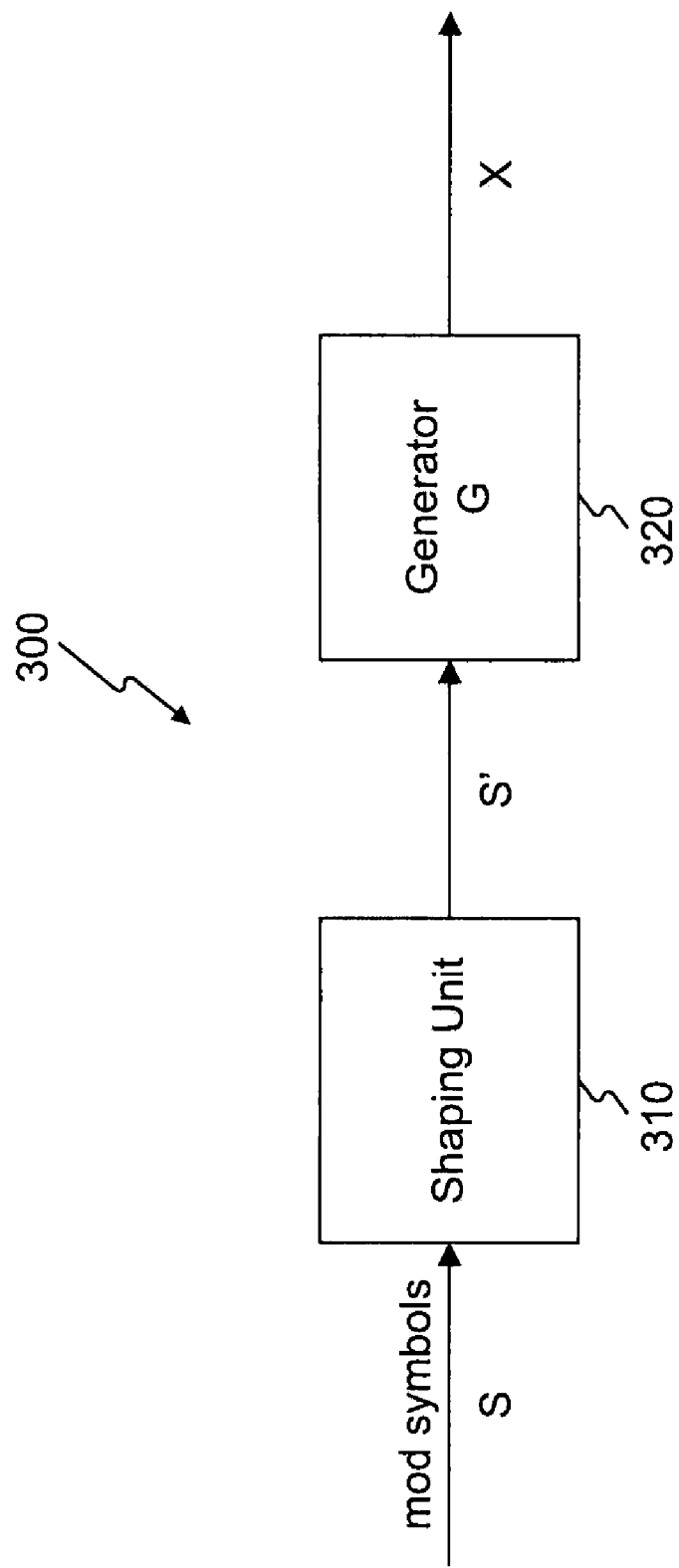
FIG. 3 shows an encoding unit.

FIG. 3 shows an exemplary block diagram 300 of encoding unit 212. A shaping unit 310 receives information symbols s, i.e. symbols undergoing modulation, from either TX processor 210 or memory device 216. Shaping unit 310 performs constellation shaping on information symbols s and provides shaped symbols s' to a generator 320. In one embodiment, information symbols s are Quadrature Amplitude Modulation (QAM) symbols, and shaping unit 310 performs shaping on information symbols s such that the shape of the constellation of transformed symbols x is substantially cubic. Generator 320 may be an encoder or an IDFT matrix which provides transformed symbols x for transmission. Shaping unit 310 performs constellation shaping on information symbols s such that the PAR of transformed symbols x is reduced.

A constellation generally consists of a set of points on an m-dimensional complex lattice or an M-dimensional real lattice (where M=2m) that are enclosed within a finite region. At any given transmitted data rate, the boundary of the signal constellation will determine its average power and PAR. The PAR of a stream of symbols to be transmitted on a certain antenna is defined as the maximum of the ratio of the instantaneously transmitted power to the average transmitted power. This definition of PAR can be represented as follows:

$$PAR = \max PAR(x_i)$$

where $PAR(x_i) = (\|x_i\|)^2 / (E[\|x_i\|^2])$, $x_i$ is an element of x, the transmitted signal, and "|| ||" represents the L2-norm.

Figure 4A:
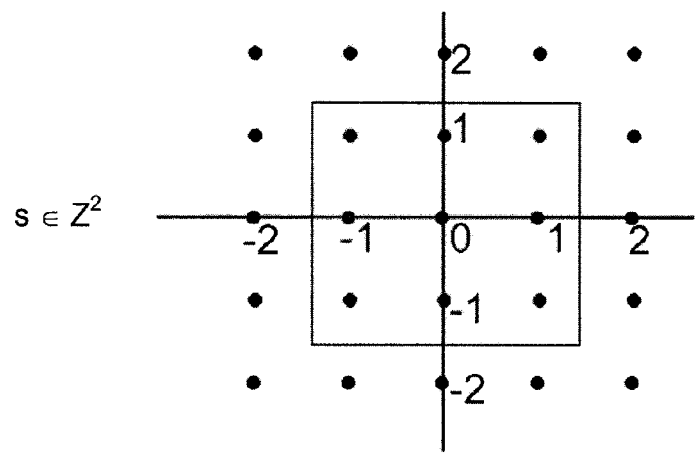
FIGS. 4A-4C show signal constellations.
Figure 4B:
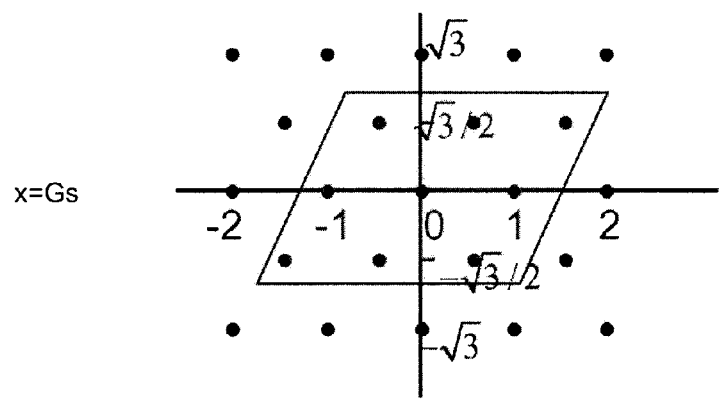
Figure 4C:
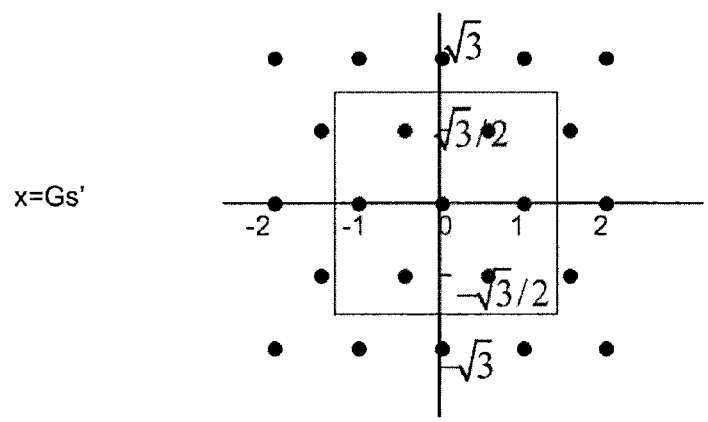

The average power and PAR vary depending on the shape of the selected signal constellation. As the size of the constellation approaches infinity, an M-dimensional constellation consisting of points enclosed within an M-dimensional cube, or cubic shaping, leads to a PAR value of 3. Embodiments consistent with the present invention are disclosed implementing the asymptotic PAR value of 3 obtained in cubic shaping. However, one of ordinary skill in the art will appreciate that various shaping methods may change PAR in different ways, some of which may be preferable to others depending on the specific coding methods and desired PAR values FIG. 4A shows a two-dimensional representation of an exemplary cubic shaping of a signal constellation of information symbols s. FIG. 4B shows the constellation of x resulting from information symbols s processed by generator unit 320 without being processed by shaping unit 310, e.g., x=Gs. As FIG. 4B shows, the constellation of x is no longer cubic, and the PAR of the constellation is consequently higher. FIG. 4C shows the constellation of transformed symbols x after shaping, i.e., x=Gs'. As shown in FIG. 4C, shaping unit 310 transforms information symbols s into s' such that the resulting constellation of x is cubic, resulting in an asymptotic PAR value of 3.

Approximately Cubic Shaping Via Hermite Normal Form (HNF) Decomposition

As shown in FIG. 3, shaping unit 310 generates shaped symbols s' from information symbols s, which are then used by generator 320 to provide transformed symbols x. Shaping unit 310 generates s' such that the output symbols x, obtained from x=Gs', are approximately cubic and have a low PAR, and generator 320 generates output symbols x.

Figure 5:
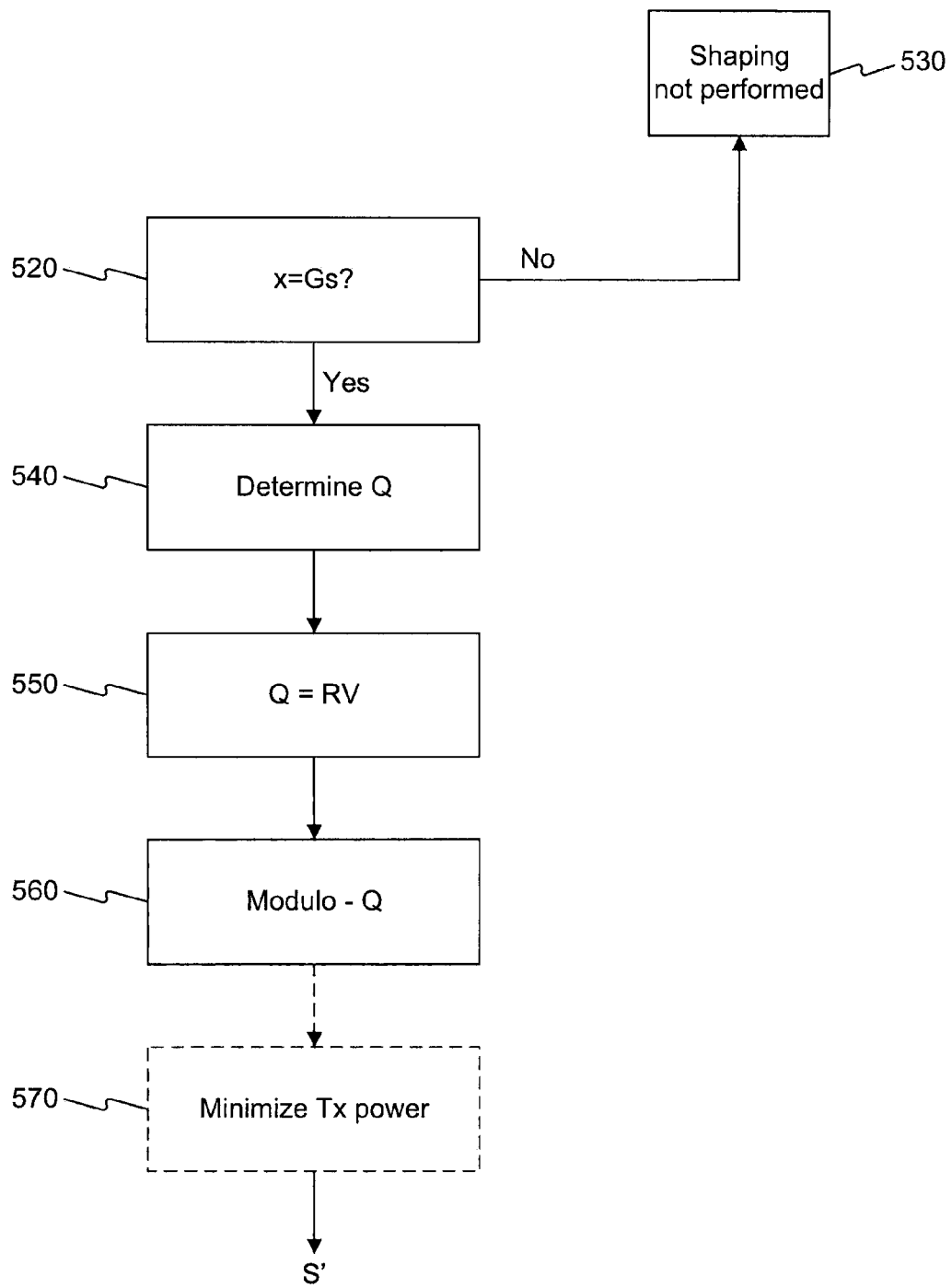
FIG. 5 shows a process of a shaping unit in accordance with a first embodiment.

FIG. 5 shows a process 500 of shaping unit 310 for applying approximately cubic shaping using HNF decomposition, in accordance with a first embodiment of the invention. Process 500 may be performed by shaping unit 212 as an ASIC or may be performed by processor 210.

Initially, shaping unit 310 determines whether or not the encoding scheme may be expressed in general form (1) above (520). If it cannot be so expressed, then shaping is not performed (530). If the encoding scheme can be expressed in general form (1), then shaping unit 310 determines a relational matrix Q (540). Q is a relational matrix that defines a relationship between s and s', where s'$\in$s+$QZ^N$, and s+$QZ^N$ is the set of equivalent points, i.e. coset, such that x=Gs', in which x has a desired approximate cubic constellation shown in the following expression (2):

$$x=Gs', \; s'\in s+QZ^N \quad (2)$$

Therefore, x$\in$G(S+$QZ^N$)

$$x\in Gs+GQZ^N$$

and GQ$\approx$$\sigma$I, where $\sigma$ is selected such that $\sigma^N$ is the total number of possible transmitted constellation points, and I is an identity matrix.

In FIG. 5, shaping unit 310 selects the values of s' of expression (2) above from within a shaped constellation whose boundary is a parallelotope defined along the columns of Q (540). Consequently, the signal boundary in the domain of transformed symbols x translates to an approximate hypercube.

Q is determined through the following relationship:

$$Q=[\sigma' G^{-1}], \; |\det(Q)| \geq \sigma^N$$

where [ ] denotes the rounding function, $\sigma'$ is a constant that ensures $|\det(Q)| \geq \sigma^N$, $\sigma^N$ is the number of possible transmitted points, and $|\det(Q)|$ is the volume of the parallelotope defined by Q or, equivalently, the number of points in the parallelotope. Because the number of cosets, i.e., $|\det(Q)|$, must be large enough to support the desired number of points transmitted, the value of $\sigma'$ chosen is the smallest value that ensures $|\det(Q)| \geq \sigma^N$. In the case of approximately cubic shaping, Q may be chosen as a nonsingular matrix.

Once shaping unit 310 determines Q (540), it indexes every coset s+$QZ^N$ for encoding. In doing so, shaping unit 310 determines coset leaders of S+$QZ^N$ in order to represent the cosets. The coset leaders of s+$QZ^N$ satisfy the following expression (3):

if $s^i \neq s^j$ then $s^i \neq s^j + Qz$, for all $\forall z \in Z^N$ \quad (3)

where $s^i$, S$s^j$ are the coset-leaders of two different cosets $s^i+QZ^N$, $s^j+QZ^N$, respectively, in order to ensure that no ambiguity results in demodulation As an example, in a case when Q=D=diag($d_1, d_2, \ldots, d_N$), the set of coset leaders, denoted as S, may be chosen as $$S=\{s=[s_1,s_2,\ldots,s_N]^T | 0 \leq s_i < d_i, i=1, 2, \ldots, N\}.$$

Here, the coset-leaders s$\in$S satisfy expression (3), and S contains all of the coset leaders.

As discussed above, the number of coset leaders is equal to $|\det(D)|$. For example, $$\text{if } D = \begin{pmatrix} 1 & 0 \\ 0 & 2 \end{pmatrix},$$

then S=$\{[0,0]^T, [0,1]^T\}$, and the number of coset-leaders in S is det(D) is 2.

In accordance with an embodiment of the invention, for a general case when Q is not a diagonal matrix, Q may be decomposed as $$Q=RV, \quad (4)$$

where V is a unimodular matrix, and R is an integer lower triangular matrix. The HNF theorem, published by C. Hermite in "Sur l'introduction des variables continues dans la theorie des nombres" (J. Reine Angew. Math., pp 191-216, 1851) and summarized below in Theorem 1 and Theorem 2, establishes the existence of the decomposition of Q=RV.

Theorem 1: Any N×N invertible integer matrix Q can be decomposed into Q=RV, where V is a unimodular matrix and R is an integer lower triangular matrix.

Let $r_{ii} \neq 0$ be the diagonal elements of R. The set of coset leaders, S, may be formed as $$S=\{s | 0 \leq r_{ii}\}. \quad (5)$$

where s=$[s_1, s_2, \ldots, s_N]^T$.

The validity of this set of coset-leaders can be verified by Theorem 2 below.

Theorem 2: Given a matrix Q=RV, the set S defined in (5) contains all the coset leaders of s+$QZ^N$.

Therefore, by performing HNF decomposition of Q into lower triangular matrix R and unimodular matrix V, shaping unit 310 is able to obtain the coset leaders from s+$QZ^N$ by first obtaining the coset leaders from R (550).

Next, to ensure that each coset leader in S is contained within a parallelotope enclosed by the columns of Q, shaping unit 310 performs a modulo-Q operation expressed below in (6) in order to place s' in the shaped constellation prior to transmitting x=Gs' (560):

$$\gamma = \lfloor Q^{-1}s \rfloor \quad (6)$$

$$s'=s-Q\gamma$$

where $\lfloor \; \rfloor$ denotes the floor function.

Optionally, shaping unit 310 may translate s' in order to minimize the average transmit power of x (570). Finally, once s' is determined, generator 320 obtains transformed signals x based on the expression (2) above.

Figure 6:
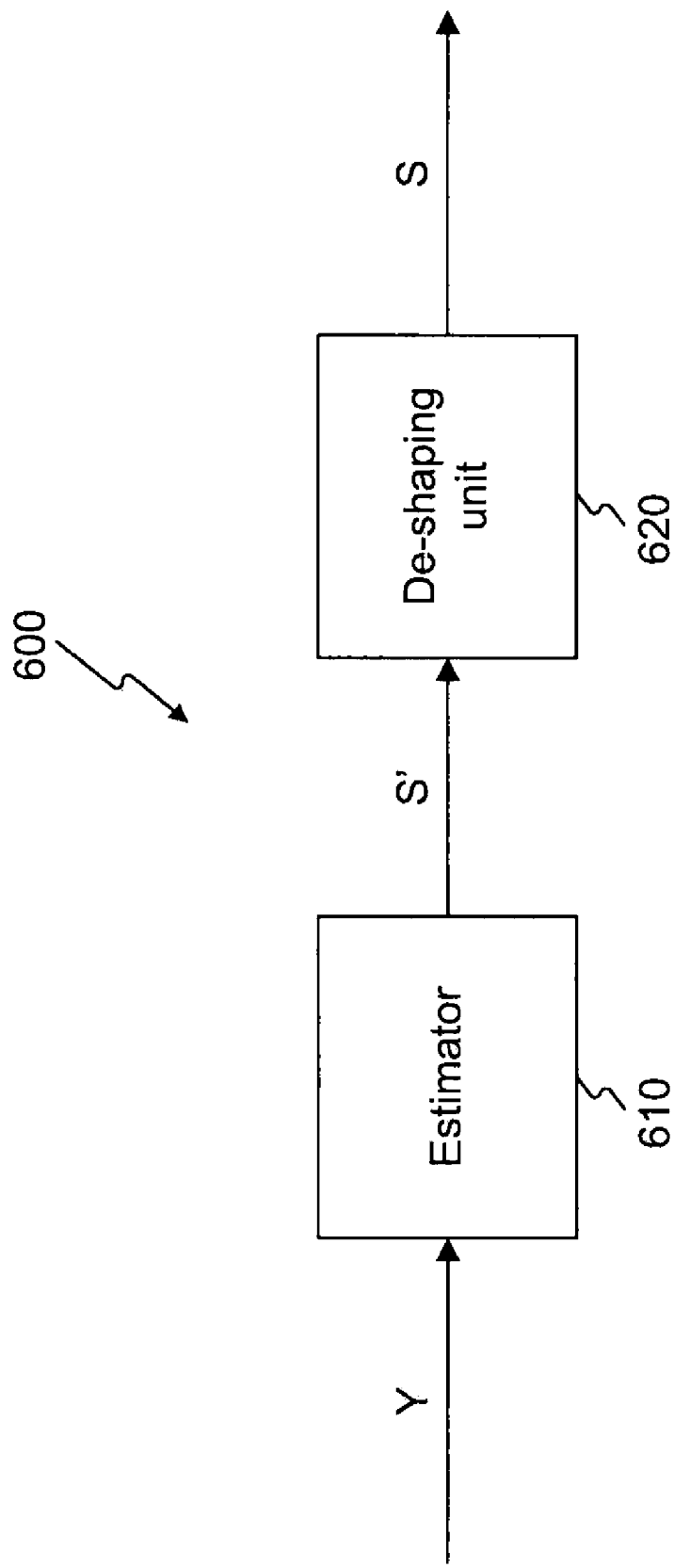
FIG. 6 shows a decoding unit.

FIG. 6 shows an exemplary block diagram 600 of decoding unit 222 in node 204. Received symbols y are processed by an estimator 610 to obtain an estimate of s'. Estimator 610 may employ a number of available methods including, but not limited to, maximum likelihood and sphere demodulation. A de-shaping unit 620 processes the estimate of s' to provide information symbols s.

Figure 7:
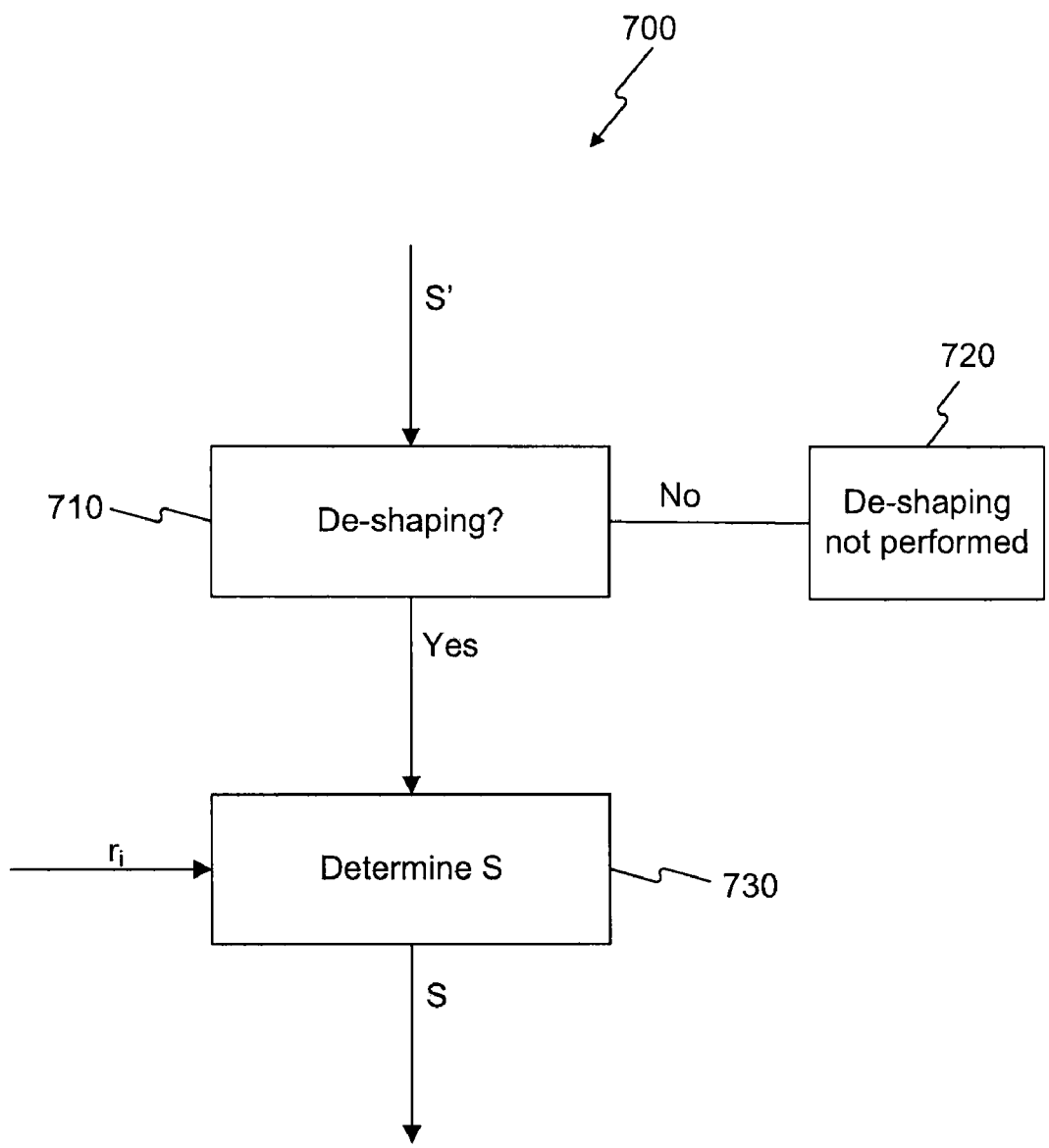
FIG. 7 shows a process of a de-shaping unit in accordance with the first embodiment.

FIG. 7 shows a process of de-shaping unit 620 in accordance with the first embodiment of the invention. In this embodiment, de-shaping unit 620 decodes symbols having been processed with HNF decomposition. First, de-shaping unit 620 receives the decoded s' from estimator 610, and determines whether or not de-shaping is required and/or desired (710). If de-shaping is not required or desired, then de-shaping is not performed (720). If de-shaping is required and/or desired, then de-shaping unit 620 determines s based on decoded s' and $r_i$, where $r_i$ is the i-th column of integer lower triangular matrix R (730), using the following algorithm:

$$s_1 = s'_1 \bmod r_{11} \ (s_1 = s'_1 + q_1 r_{11})$$
$$\text{for } i = 2 : N$$
$$\quad s' = s' + q_{i-1} r_{i-1}$$
$$\quad s_i = s'_i \bmod r_{ii} \ (s_i = s'_i + q_i r_{ii})$$
$$\text{end}$$

where $s_i$ is the i-th element of s; $q_i$ is the modulo quotient; and $r_{ii}$ is the i-th diagonal element of R. Because the generator matrix G is fixed for a given application, $r_i$ is pre-calculated and stored as a part of the application system set-up and therefore known to both the transmitter and the receiver.

Alternatively, values of s may be pre-calculated and stored, along with relevant algorithms used to obtain s, in a look-up table (not shown) in memory 226. If a look-up table is used, then de-shaping unit 620 obtains s by referring to the look-up table (730).

Approximately Cubic Shaping Via Integer Reversible Matrix Mapping

Figure 8:
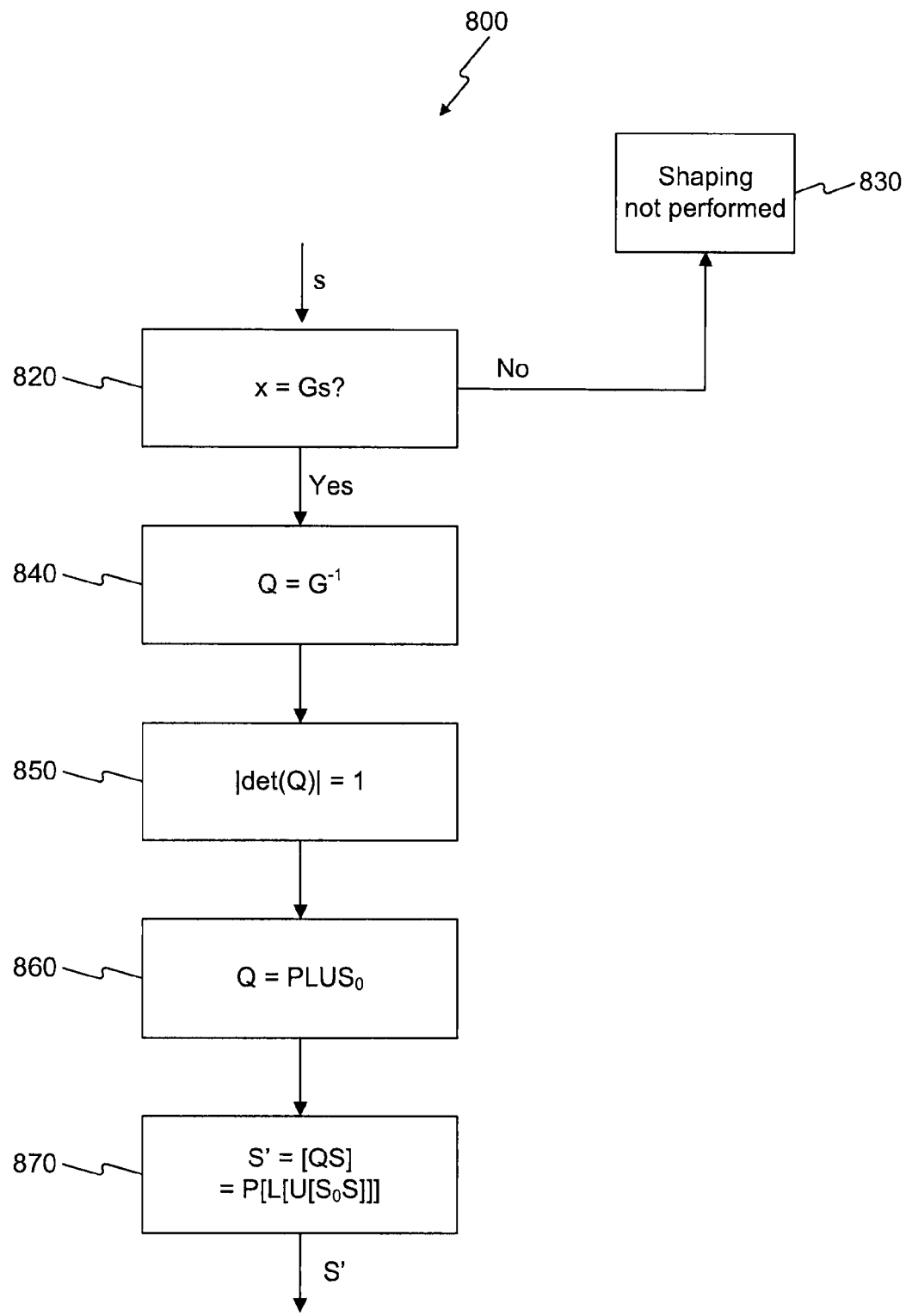
FIG. 8 shows a process of an encoding unit in accordance with a second embodiment.

FIG. 8 shows a process 800 of shaping unit 310 in accordance with a second embodiment of the invention. Process 800 applies approximately cubic shaping using Integer Reversible Matrix Mapping (IRMM). IRMM can avoid encoding computations involving large numbers, because integer constraints on the entries of relational matrix Q may be relaxed, and a nonlinear mapping may be utilized. Accordingly, IRMM may facilitate a useful encoding mechanism. Moreover, IRMM enables the resulting |det(Q)| to be expressed in the form of $2^M$, a form that resembles the number of points in the constellation of all practical communication systems.

Initially, shaping unit 310 determines whether or not the encoding scheme may be expressed as general form (1) above (820). If it cannot, then shaping is not performed (830).

On the other hand, if the encoding scheme can be expressed in the general form (1), shaping unit 310 calculates the relational matrix Q to be $G^{-1}$ (840) and normalizes |det(Q)| to be 1 (850). That is, $$Q = G^{-1}, \text{ and}$$

$$|\det(Q)| = 1.$$

By normalizing |det(Q)| to 1, encoding unit 212 ensures that relational matrix Q may be processed through IRMM.

IRMM is explained in "Matrix factorizations for reversible integer mapping" by Hao et al (IEEE trans. Signal Processing, vol. 49, pp. 2314-2324, October 2001) (hereinafter "Hao"), the contents of which are hereby incorporated in their entirety.

As Hao shows, if there exists an elementary reversible structure based on a matrix for perfectly invertible integer implementation, then the matrix is called an elementary reversible matrix (ERM). For an upper triangular elementary reversible matrix (TERM) A with elements $\{a_{mn}\}$ containing diagonal elements $j_m = \pm 1$, its reversible integer mapping from input s to output y is defined as y=[As], where $$y_m = j_m s_m + \left[\sum_{n=M+1}^{N} a_{mn} s_n\right]$$

$$y_N = j_N s_N$$

$$m = 1, 2, 3, \ldots N-1,$$

and its inverse mapping is $$s_N = y_N / j_N \quad (7)$$

$$s_m = (1/j_m)\left(y_m - \left[\sum_{n=M+1}^{N} a_{mn} s_n\right]\right)$$

$$m = N-1, N-2, \ldots 1.$$

Similar results may be obtained for a lower TERM.

A single-row ERM (SERM) is another feasible ERM in which $j_m = \pm 1$ on the diagonal, and all but one row of off-diagonal elements are all zeros. The reversible integer mapping of SERM is as follows:

$$y_{m'} = j_{m'} s_{m'} + \left[\sum_{n \ne m'}^{N} a_{m'n} s_n\right], \text{ for } m = m'$$

$$y_m = j_m s_m, \quad \text{for } m \ne m'$$

where m' represents the row with nonzero off-diagonal elements. Its inverse operation is $$s_m = y_m / j_m, \text{ for } m = m' \quad (8)$$

$$s_{m'} = \left(y_{m'} - \left[\sum_{n \ne m'} a_{m'n} s_n\right]\right)/j_{m'}.$$

If all the diagonal elements of a TERM are equal to 1, the TERM is called a unit TERM. Similarly, a SERM whose diagonal elements are equal to 1 is called a unit SERM. Hao further shows that a matrix has a "$PLUS_o$" factorization if and only if its determinate is ±1. In $PLUS_o$, P is a permutation matrix that may carry a negative sign, L and U are unit lower and unit upper TERMs, respectively, and $S_o$ is a unit SERM with m'=N.

Accordingly, shaping unit 310 obtains an integer to integer reversible mapping (860) by decomposing the relational matrix Q previously obtained (850) into $$Q = PLUS_o, \quad (9)$$

where P is a permutation matrix that may carry a negative sign, L and U are unit lower and unit upper TERMs, respectively, and $S_o$ is a unit SERM.

Finally, shaping unit 310 obtains symbols s' through the following algorithm $$s' = [Qs]$$

or equivalently, $$s' = P[L[U[S_0 s]]], s \in S$$

$$S' = \{s' | 0 \ge s_i \ge \sigma\}.$$

where [ ] denotes the rounding function, S is the constellation of information symbols s chosen from an N-dimensional integer lattice $Z^N$, S' is the shaped constellation, and σ is an integer chosen such that $\sigma^N$ equals the total number of possible transmitted constellation points (870).

Figure 9:
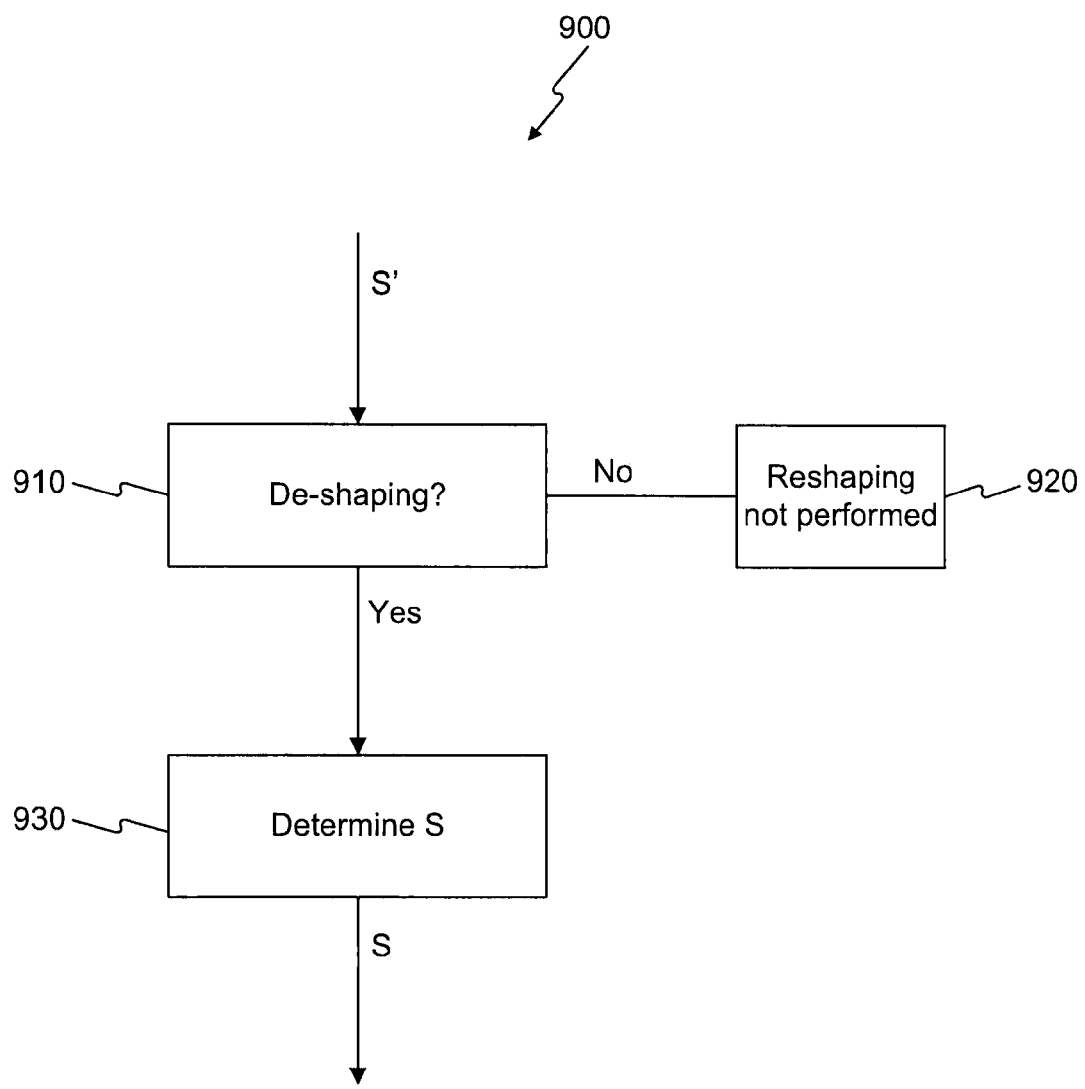
FIG. 9 shows a process of a de-shaping unit in accordance with the second embodiment.

FIG. 9 shows a process 900 of de-shaping unit 620 in accordance with the second embodiment of the invention. Process 900 decodes symbols having been processed with IRMM. De-shaping unit 620 receives the decoded s' from estimator 610, and determines whether or not de-shaping is required and/or desired (910). If de-shaping is not required or desired, then de-shaping is not performed (920). If de-shaping is required and/or desired, then de-shaping unit 620 recovers s (930) using decoded s' based on the relationship $$s=[S_0^{-1}[U^1[L^{-1}P^{-1}(s')]]],$$

where $[U^1v]$ denotes the inverse operation of the upper triangular TERM U on vector v given by expression (7), $[L^{-1}v]$ denotes the inverse operation of the lower triangular TERM L on vector v, and $[S_0^{-1}v]$ is the inverse operation of the SERM $S_0$ on vector v given by expression (8).

In accordance with one embodiment of the invention, when complex representation is used for shaping, general form (1) becomes $$x=Gs,\ s\in(Z[i])^N,\ G\in C^{N\times N}, \tag{10}$$

where the rounding function now operates on real and imaginary components individually, and the corresponding $j_m=\pm 1$ in SERM and TERM becomes either $\pm 1$ or $\pm i$, where i is an imaginary unit. In expression (10) above, the inverse operations (7) and (8) still apply.

In this case, Q may be decomposed into $$Q=PLD_RUS_0, \tag{11}$$

if and only if $\det(Q)=\det(D_R)\neq 0$, where $D_R=\mathrm{diag}(1,1,\ldots,1,e^{i\Theta})$, L and U are lower and upper TERMs, respectively, and P is a permutation matrix. If $\det(Q)=\pm 1$ or $\pm i$, then the simplified factorization of $Q=PLUS_0$ is obtained. That is, expression (11) is a generalization of expression (9).

In a case where $\det(Q)=e^{i\Theta}$ and is not equal to $\pm 1$ or $\pm i$, a complex rotation $e^{i\Theta}$ may be implemented using the real and imaginary components of a complex number factorized into three unit TERMs, as follows:

$$\begin{pmatrix} \cos\theta & -\sin\theta \\ \sin\theta & \cos\theta \end{pmatrix} = \begin{pmatrix} 1 & 0 \\ (1-\cos\theta)/\sin\theta & 1 \end{pmatrix}\begin{pmatrix} 1 & -\sin\theta \\ 0 & 1 \end{pmatrix}\cdot\begin{pmatrix} 1 & 0 \\ (1-\cos\theta)/\sin\theta & 1 \end{pmatrix}$$

$$= \begin{pmatrix} 1 & (\cos\theta)/\sin\theta \\ 0 & 1 \end{pmatrix}\begin{pmatrix} 1 & 0 \\ \sin\theta & 1 \end{pmatrix}\cdot\begin{pmatrix} 1 & (\cos\theta-1)/\sin\theta \\ 0 & 1 \end{pmatrix}$$

This equation may also be used when Q is the Fourier transform matrix, such as in an OFDM signal, in which all coefficients assume the form $e^{i\Theta}$.

In one embodiment, values and algorithms used to obtain s' in process 800 may be pre-calculated and stored in a look-up table (not shown) in memory 216, and values and algorithms used to obtain s in process 900 may be pre-calculated and stored in a look-up table (not shown) in memory 226. If look-up tables are used, then shaping unit 310 obtains s' in process 800 by referring to the look-up table in memory 216, and de-shaping unit 620 obtains s in process 900 by referring to the look-up table in memory 226.

Figure 10:
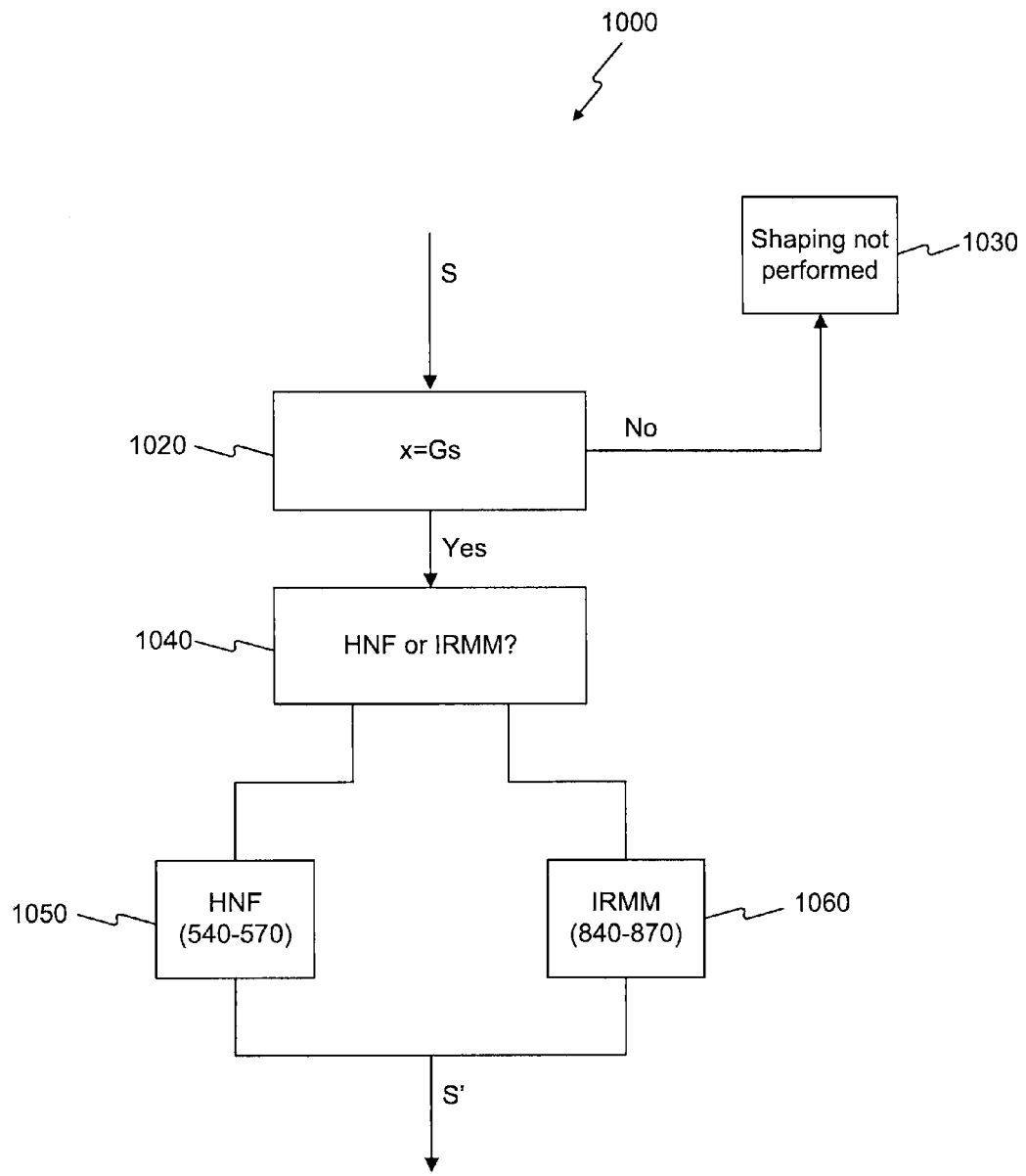
FIG. 10 shows a process of an encoding unit in accordance with a third embodiment.

FIG. 10 shows a process 1000 of shaping unit 310 in accordance with a third embodiment of the invention, and selectively applies either HNF decomposition or IRMM.

Initially, shaping unit 310 determines whether or not the encoding scheme may be expressed in general form (1) above (1020). If it cannot, then shaping is not performed (1030).

If the encoding scheme may be expressed in general form (1), then shaping unit 310 determines whether HNF decomposition or IRMM is desired (1040). If HNF decomposition is desired, then shaping unit 310 performs the operations described in 540 through 570 in process 500, using HNF decomposition, in order to obtain s' (1050). On the other hand, if IRMM is desired, then shaping unit 310 performs the operations corresponding to 840 through 870 in process 800, using IRMM, in order to obtain s' (1060).

Figure 11:
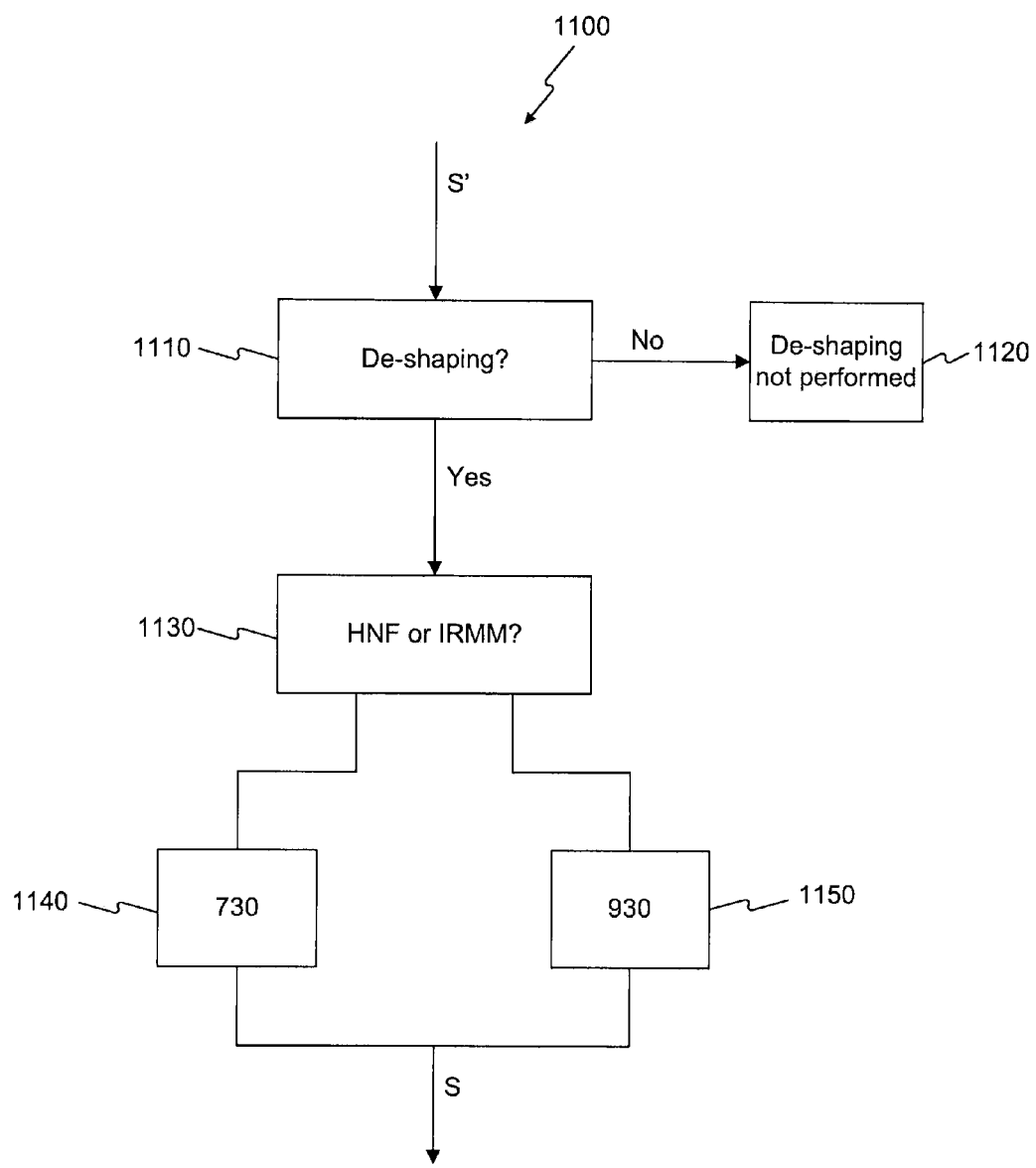
FIG. 11 shows a process of a de-shaping unit in accordance with the third embodiment.

FIG. 11 shows a process 1100 of de-shaping unit 620 for decoding symbols in accordance with the third embodiment of the invention. Initially, de-shaping unit 620 receives the decoded s' from estimator 610, and determines whether or not de-shaping is required and/or desired (1110). If de-shaping is not required or desired, then de-shaping is not performed (1120). If de-shaping is required and/or desired, then de-shaping unit 620 determines whether the received symbols were processed with HNF decomposition or IRMM (1130).

If de-shaping unit 620 determines that the symbols were processed with HNF decomposition, then it performs the operation corresponding to 730 of process 700 in order to obtain s from s' (1140). On the other hand, if de-shaping unit 620 determines that IRMM was used, then it performs the operation corresponding to 930 of process 900 in order to obtain s from s' (1150).

Figure 12A:
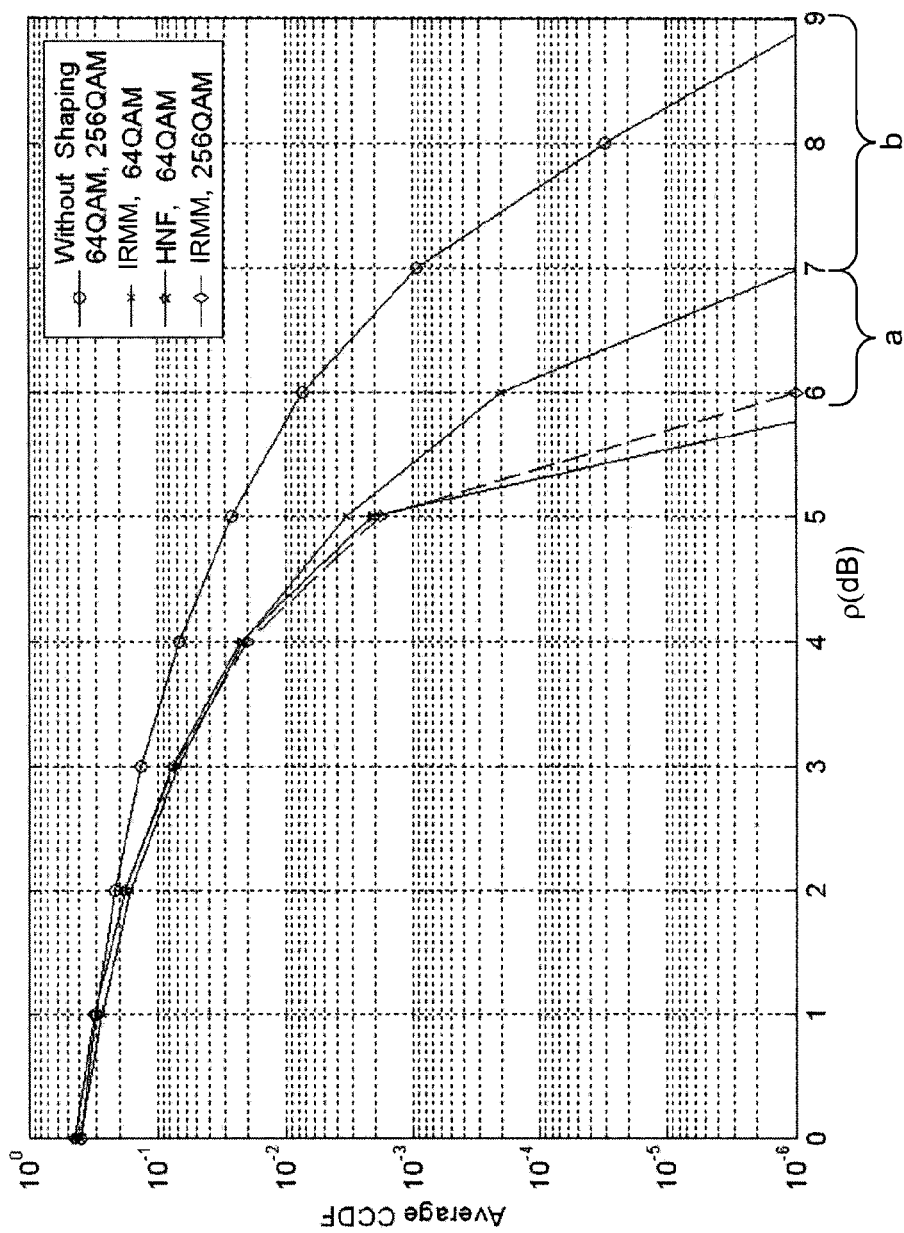
FIGS. 12A-12C show simulation results.
Figure 12B:
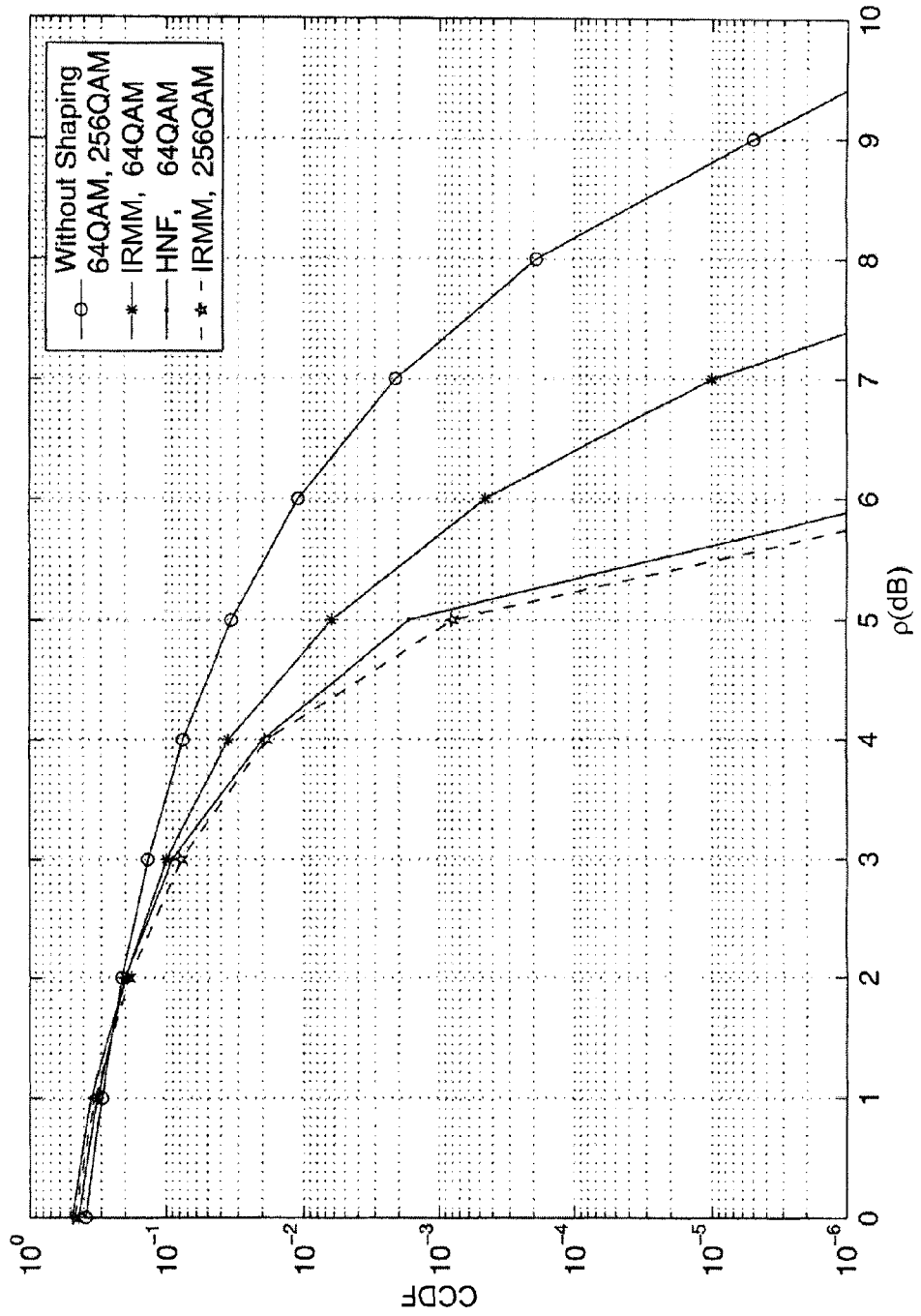
Figure 12C:
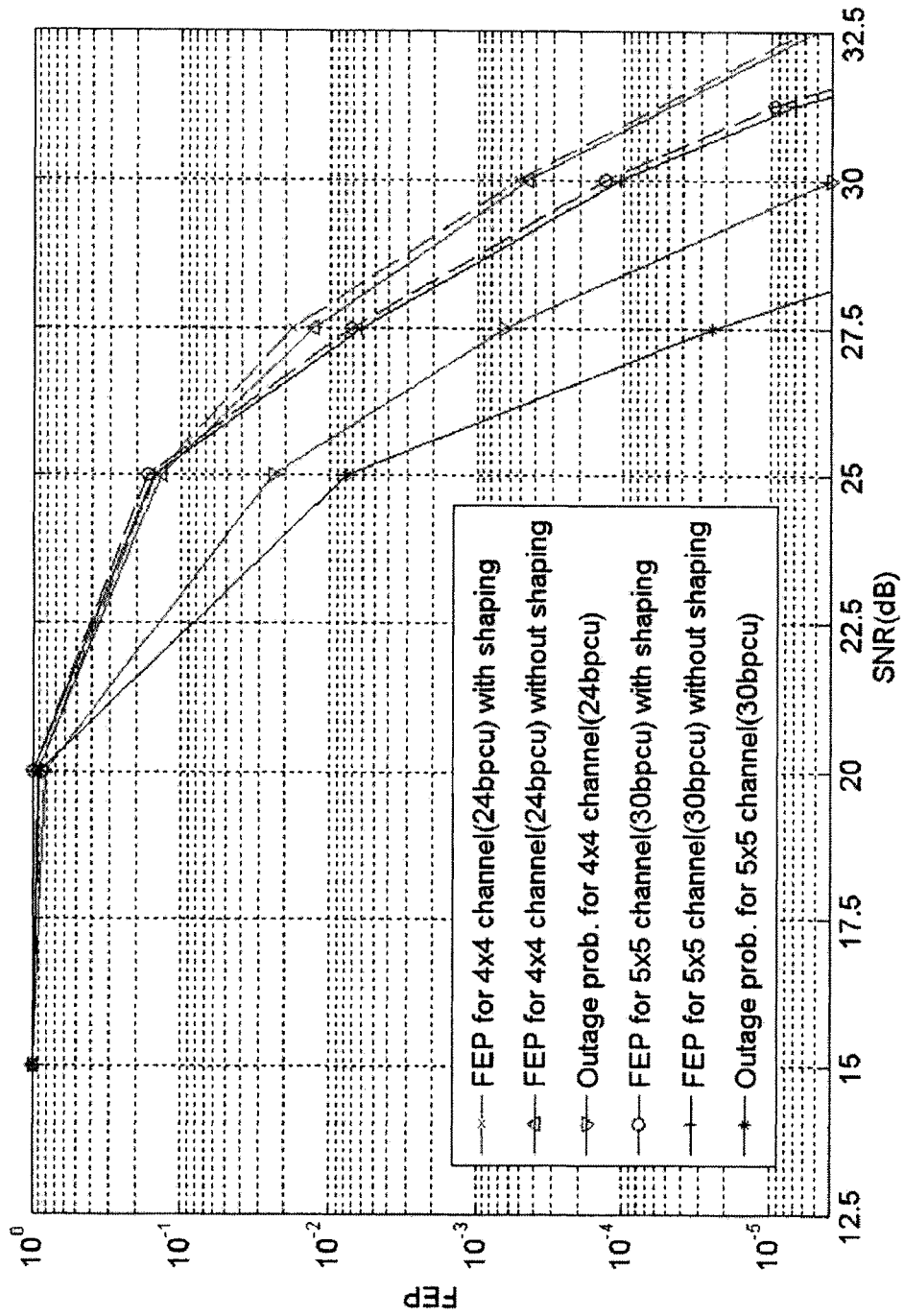

FIGS. 12A-12C show simulation results for the shaping of exemplary space-time codes achieving the optimal D-MG tradeoff by using $10^6$ randomly generated symbols. Because the signals transmitted by antennas have similar statistical distributions, the simulation results are presented as an average complementary cumulative density function CCDF of the PAR of signals on each antenna i, expressed as follows:

$$CCDF\{PAR(x_i),\rho\}=P\{PAR(x_i)>\rho\}. \tag{12}$$

where $\rho$ is the value on the abscissa. Expression (12) may be interpreted to be the probability that, for symbols transmitted by antenna i, the $PAR(x_i)$ exceeds the value $\rho$ at any given moment.

In FIG. 12A, an exemplary 4×4 space-time code comprising 4 transmit antennas and 4 symbol durations, designed to achieve the optimal D-MG tradeoff, was used to generate the simulation. FIG. 12A shows the average $CCDF\{PAR(x_i),\rho\}$ on 4 antennas using the HNF and IRMM approximately cubic shaping presented above. The horizontal axis shows the $\rho$ in decibels (dB), and the vertical axis shows the average $CCDF\{PAR(x_i),\rho\}$. The effect of the constellation size is also included in the simulation. As FIG. 12A shows, when the constellation size is moderate (64 QAM), the HNF shaping method results in an approximate additional 1.3 dB PAR reduction over the IRMM shaping method (designated "a" in FIG. 12A), which provides an approximate 2 dB PAR reduction from the unshaped method (designated "b" in FIG. 12A). This additional PAR reduction may result from HNF shaping placing every transmitted point in an exact parallelotope, which is an approximate hypercube, while IRMM shaping yields an exact cubic constellation with few points outside the hypercube. Consequently, IRMM shaping generates certain points with higher PAR. As the constellation size becomes large, however, both methods result in nearly equal PAR reductions, and the PAR approaches its optimal value under cubic shaping, namely 10 log 3, or about 4.78 dB, as illustrated in FIG. 12A.

In FIG. 12B, an exemplary 5×5 space-time code comprising 5 transmit antennas and 5 symbol durations, designed to achieve the optimal D-MG tradeoff, is used to generate the simulation. The axes of FIG. 12B represent the same quantities as those of FIG. 12A. Because FIG. 12B shows the average CCDF of PAR on 5 antennas using the HNF and IRMM approximately cubic shaping, when compared with FIG. 12A, which shows the average CCDF of PAR on 4 antennas, FIG. 12B demonstrates that a larger PAR reduction is achieved as the number of antennas increases.

Finally, FIG. 12C shows the frame error probability (FEP) of communication systems with 4 or 5 transmit antennas and 4 or 5 receive antennas in quasi-static Rayleigh fading channels, plotted as a function of average signal-to-noise ratio (SNR). Exemplary perfect space-time codes that achieve the optimal D-MG tradeoff are used for 4×4 and 5×5 channels. A sphere decoder is used for lattice decoding. As FIG. 12C shows, space-time codes transmitted after shaping yield nearly indistinguishable error performance as codes transmitted without shaping. That is, the PAR reduction methods consistent with the present invention do not affect the performance of space-time codes.

Compared to existing PAR reduction methods, the methods disclosed herein significantly reduce computing complexity. Additionally, methods provided herein work for any nonsingular generator/modulation matrix while achieving better PAR reduction. Moreover, the application of the present invention is not limited to OFDM and space-time coded systems; embodiments consistent with the present invention may be practiced in any system with encoding schemes that may be expressed in the general form (1).

The foregoing description has been presented for purposes of illustration. It is not exhaustive and does not limit the invention to the precise forms or embodiments disclosed. Modifications and adaptations of the invention will be apparent to those of ordinary skill in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transmitting data in a communication system employing an encoding scheme, the method comprising:
    processing the data in accordance with a particular processing scheme to provide a plurality of information symbols;
    performing approximate cubic shaping on a constellation of the plurality of information symbols to obtain a plurality of shaped symbols;
    processing the plurality of information symbols such that $s'=s-Qy$, wherein $s'$ is the plurality of shaped symbols, $s \in Z^N$, where $s$ is a vector of the plurality of information symbols chosen from an N-dimensional integer lattice $Z^N$, Q is a relational matrix, and $y=\lfloor Q^{-1}s \rfloor$, where $\lfloor \ \rfloor$ denotes the floor function, and wherein Q satisfies relationships $Q=[\sigma'G^{-1}]$, $|\det(Q)| \geq \sigma^N$, where [ ] denotes the rounding function, $\sigma'$ is a constant ensuring $|\det(Q)| \geq \sigma^N$, $\sigma^N$ is the number of possible transmitted constellation points, and $|\det(Q)|$ represents the absolute value of the determinant of Q;
    processing the plurality of shaped symbols in accordance with the encoding scheme to obtain a plurality of transformed signals such that a peak to average power ratio (PAR) of the plurality of transformed symbols is lower than the PAR would be if the information symbols were not shaped into shaped symbols prior to processing into transformed symbols, wherein the encoding scheme may be expressed in a form $x=Gs'$, $-G \in R^{N \times N}$, where x is an isomorphic vector representation of the transformed signals, G is an N×N invertible generator matrix and N is an integer $\geq 0$, and R represents the real domain; and
    transmitting the plurality of transformed signals over a communication network.

2. The method of claim 1, wherein performing the approximate cubic shaping comprises performing matrix decomposition.

3. The method of claim 2, wherein performing the approximate cubic shaping comprises performing Hermite normal form matrix decomposition.

4. The method of claim 2, further comprising performing nonlinear mapping.

5. The method of claim 4, wherein performing nonlinear mapping comprises performing integer reversible matrix mapping.

6. The method of claim 5, further comprising processing the plurality of information symbols such that $s'=[Qs]$, and $Q=G^{-1}$.

7. The method of claim 6, further comprising:
    normalizing the absolute value of the determinant of Q to 1; and
    decomposing Q such that $Q=PLUS_o$,
    where P is a permutation matrix, L and U are respectively unit lower and unit upper triangular elementary reversible matrices, and $S_o$ is a unit single-row elementary reversible matrix.

8. The method of claim 7, further comprising obtaining the plurality of shaped symbols s' such that $s'=P[L[U[S_o(s)]]]$.

9. The method of claim 6, further comprising decomposing Q such that $Q=PLD_RUS_o$, if $\det(Q)=\det(D_R) \neq 0$, where P is a permutation matrix, L and U are respectively unit lower and unit upper triangular elementary reversible matrices, $D_R=\mathrm{diag}(1, 1, \ldots, 1, e^{i\Theta})$, and $S_o$ is a unit single-row elementary reversible matrix.

10. The method of claim 1, further comprising:
    providing the plurality of shaped symbols such that $s' \in s+QZ^N$; and
    providing the plurality of transformed signals such that $x=Gs'$.

11. The method of claim 1, further comprising decomposing Q into $Q=RV$, where R is an integer lower triangular matrix, and V is a unimodular matrix.

12. The method of claim 1, wherein Q satisfies a relationship $GQ \approx \sigma I$, where $\sigma$ is selected such that $\sigma^N$ is the total number of possible transmitted constellation points and I is an identity matrix.

13. A method for receiving a plurality of data signals in a communication system employing an encoding scheme, the method comprising:
    receiving a plurality of transmitted signals including a plurality of shaped symbols, wherein a constellation of the received signals were shaped prior to transmission;
    processing the plurality of received signals in an estimator to obtain decoded symbols; and
    de-shaping the decoded symbols to obtain information symbols s through $s_i = s'_i \bmod r_{ii}(s_i = s'_i + q_i r_{ii})$ $s' = s' + q_{i-1} r_{i-1}$ where $s_i$ is the i-th element of the information symbol s; s' in this expression is the plurality of decoded symbols; $r_{ii}$ is the i-th diagonal element of an integer lower triangular matrix R; $q_i$ is the modulo quotient; and $r_i$ is the i-th column of the integer lower triangular matrix R,
    wherein the constellation of the transmitted signals are processed prior to transmission, such that a peak to average power ratio (PAR) of the transmitted signals is lower than the PAR would be if the transmitted signals were not shaped prior to transmission, and in accordance with the encoding scheme that may be expressed in the form x=Gs', wherein s' in this expression is the plurality of shaped symbols, x is an isomorphic vector representation of transformed signals prior to transmission, $G \in R^{N \times N}$, where G is an N×N invertible generator matrix and N is an integer $\geq 0$, $s \in Z^N$, where s is the vector of a plurality of information symbols chosen from an N-dimensional integer lattice $Z^N$, and R represents the real domain.

14. The method of claim 13, further comprising performing maximum likelihood estimation or sphere demodulation/decoding.

15. The method of claim 13, further comprising obtaining the information symbols s through $$s=[S_0^{-1}[U^{-1}[L^{-1}P^{-1}(s')]]],$$

where P is a permutation matrix, L and U are respectively unit lower and unit upper triangular elementary reversible matrices, $S_o$ is a unit single-row elementary reversible matrix, $[U^{-1}v]$ denotes the inverse operation of the upper triangular elementary reversible matrix (TERM) U on vector v, $[L^{-1}v]$ denotes the inverse operation of the lower TERM L, $[S_0^{-1}v]$ is the inverse operation of the single-row elementary reversible matrix $S_0$, and s' in this expression is the plurality of shaped symbols.

16. A device for transmitting data in a communication system employing an encoding scheme, the device comprising:
a processor to process the data in accordance with a particular processing scheme to provide a plurality of information symbols;
a shaping unit to shape a constellation of the plurality of information symbols using approximate cubic shaping to obtain a plurality of shaped symbols;
an encoder to encode the plurality of shaped symbols in accordance with the encoding scheme to obtain a plurality of transformed signals such that a peak to average power ratio (PAR) of the plurality of transformed symbols is lower than the PAR would be if the information symbols were not shaped into shaped symbols prior to processing into transformed symbols, wherein the encoding scheme may be expressed in a form x=Gs', wherein s' is the plurality of shaped symbols, x is an isomorphic vector representation of the transformed signals, $G \in R^{N \times N}$, G is an N×N invertible generator matrix and N is an integer $\geq 0$, $s \in Z^N$, s is a vector of the plurality of information symbols chosen from an N-dimensional integer lattice $Z^N$, and R represents the real domain; and
a transmitter to transmit the plurality of transformed signals over a communication network,
wherein the processor processes the plurality of information symbols such that s'=s−Qy, wherein Q is a relational matrix, and $v=\lfloor Q^{-1}s \rfloor$, where $\lfloor \ \rfloor$ denotes the floor function, and wherein Q satisfies relationships $Q=[\sigma'G^{-1}]$, $[\det(Q)] \geq \sigma^N$, where [ ] denotes the rounding function, $\sigma'$ is a constant ensuring $|\det(Q)| \geq \sigma^N$, $\sigma^N$ is the number of possible transmitted constellation points, and $|\det(Q)|$ represents the absolute value of the determinant of Q.

17. The device of claim 16, further configured to perform the approximate cubic shaping through matrix decomposition.

18. The device of claim 17, further configured to perform Hermite normal form matrix decomposition.

19. The device of claim 17, further configured to perform nonlinear mapping.

20. The device of claim 17, further configured to perform integer reversible matrix mapping.

21. The device of claim 20, further configured to process the plurality of information symbols such that $$s'=[Qs], \text{ and}$$

$$Q=G^{-1}.$$

22. The device of claim 21, further configured to normalize the absolute value of the determinant of Q to 1 and decomposes Q such that $Q=PLUS_o$,
where P is a permutation matrix, L and U are respectively unit lower and unit upper triangular elementary reversible matrices, and $S_o$ is a unit single-row elementary reversible matrix.

23. The device of claim 22, further configured to obtain the plurality of shaped symbols s' such that $s'=P[L[U[S_o(s)]]]$.

24. The device of claim 21, further configured to decompose Q such that $$Q=PLD_RUS_o, \text{ if } \det(Q)=\det(D_R) \neq 0,$$

where P is a permutation matrix, L and U are respectively unit lower and unit upper triangular elementary reversible matrices, $D_R=\text{diag}(1, 1, \ldots, 1, e^{i\Theta})$, and $S_o$ is a unit single-row elementary reversible matrix.

25. The device of claim 16, further configured to provide the plurality of shaped symbols such that $s' \in s+QZ^N$ and wherein the encoder provides the plurality of transformed signals such that x=Gs'.

26. The device of claim 16, further configured to decompose Q into $$Q=RV,$$

where R is an integer lower triangular matrix, and V is a unimodular matrix.

27. The device of claim 16, wherein Q satisfies a relationship $GQ \approx \sigma I$, where $\sigma$ is selected such that $\sigma^N$ is the total number of possible transmitted constellation points and I is an identity matrix.

28. A device for receiving a plurality of data signals in a communication system employing an encoding scheme, the device comprising:
a receiver to receive a plurality of transmitted signals as the received signals including a plurality of shaped symbols, wherein the constellation of the transmitted signals were shaped prior to transmission;
a processor to process the plurality of received signals in an estimator to obtain decoded symbols; and
a de-shaping unit to de-shape the decoded symbols to obtain information symbols,
wherein the constellation of the transmitted signals are processed prior to transmission, such that a peak to average power ratio (PAR) of the transmitted signals is lower than the PAR would be if the transmitted signals were not shaped, and in accordance with the encoding scheme that may be expressed in the form x=Gs', wherein s' of this expression is the plurality of shaped symbols, is an isomorphic vector representation of transformed signals prior to transmission, $GR^{N \times N}$, G is an N×N invertible generator matrix and N is an integer $\geq 0$, $s \in Z^N$, s is a vector of a plurality of information symbols chosen from an N-dimensional integer lattice $Z^N$, and R represents the real domain, and wherein the device obtains the information symbols s through $$s_i = s'_i \bmod r_{ii}(s_i = s'_i + q_i r_{ii})$$

$$s' = s' + q_{i-1} r_{i-1}$$

where $s_i$ is the i-th element of the information symbol s; s' of this expression is the plurality of decoded symbols; $r_{ii}$ is the i-th diagonal element of an integer lower triangular matrix; $q_i$ is the modulo quotient; and $r_i$ is the i-th column diagonal element of the integer lower triangular matrix.

29. The device of claim 28, further configured to perform maximum likelihood estimation or sphere demodulation/decoding.

30. The device of claim 28, further configured to obtain information symbols s through $$s = [S_0^{-1}[U^{-1}[L^{-1}P^{-1}(s)]]],$$

where P is a permutation matrix, L and U are respectively unit lower and unit upper triangular elementary reversible matrices, $S_o$ is a unit single-row elementary reversible matrix, $[U^{-1}v]$ denotes the inverse operation of the upper triangular elementary reversible matrix (TERM) U on vector v, $[L^{-1}v]$ denotes the inverse operation of the lower TERM L, $[S_0^{-1}v]$ is the inverse operation of the single-row elementary reversible matrix $S_0$, and s' in this expression is the plurality of shaped symbols.

* * * * *

UNITED STATES PATENT AND TRADEMARK OFFICE
CERTIFICATE OF CORRECTION

PATENT NO. : 8,363,749 B2  
APPLICATION NO. : 12/431350  
DATED : January 29, 2013  
INVENTOR(S) : Chung-Pi Lee and Hsuan-Jung Su Page 1 of 1

It is certified that error appears in the above-identified patent and that said Letters Patent is hereby corrected as shown below:

In the Claims

Claim 1, Col. 13, Line 42, "s'=s-Qy" should read as --s'=s-Q$\gamma$--.

Claim 1, Col. 13, Line 59, "-G$\in$R$^{N \times N}$" should read as --G$\in$R$^{N \times N}$--.

Claim 16, Col. 15, Line 56, "s'=s-Qy" should read as --s'=s-Q$\gamma$--.

Claim 16, Col. 15, Line 57, "v=$\lfloor$Q$^{-1}$s$\rfloor$" should read as --$\gamma$=$\lfloor$Q$^{-1}$s$\rfloor$--.

Claim 16, Col. 15, Line 59, "[det(Q)]$\geq\sigma^N$" should read as --|det(Q)|$\geq\sigma^N$--.

Claim 28, Col. 16, Line 63, "GR$^{N \times N}$" should read as --G$\in$R$^{N \times N}$--.

Signed and Sealed this  
Twenty-second Day of October, 2013

Teresa Stanek Rea  
*Deputy Director of the United States Patent and Trademark Office*